Sept. 13, 1966 P. J. WOODING 3,272,905
CONTINUOUS WEIGHING OF A CONSUMABLE ELECTRODE
Filed June 24, 1963 2 Sheets-Sheet 1
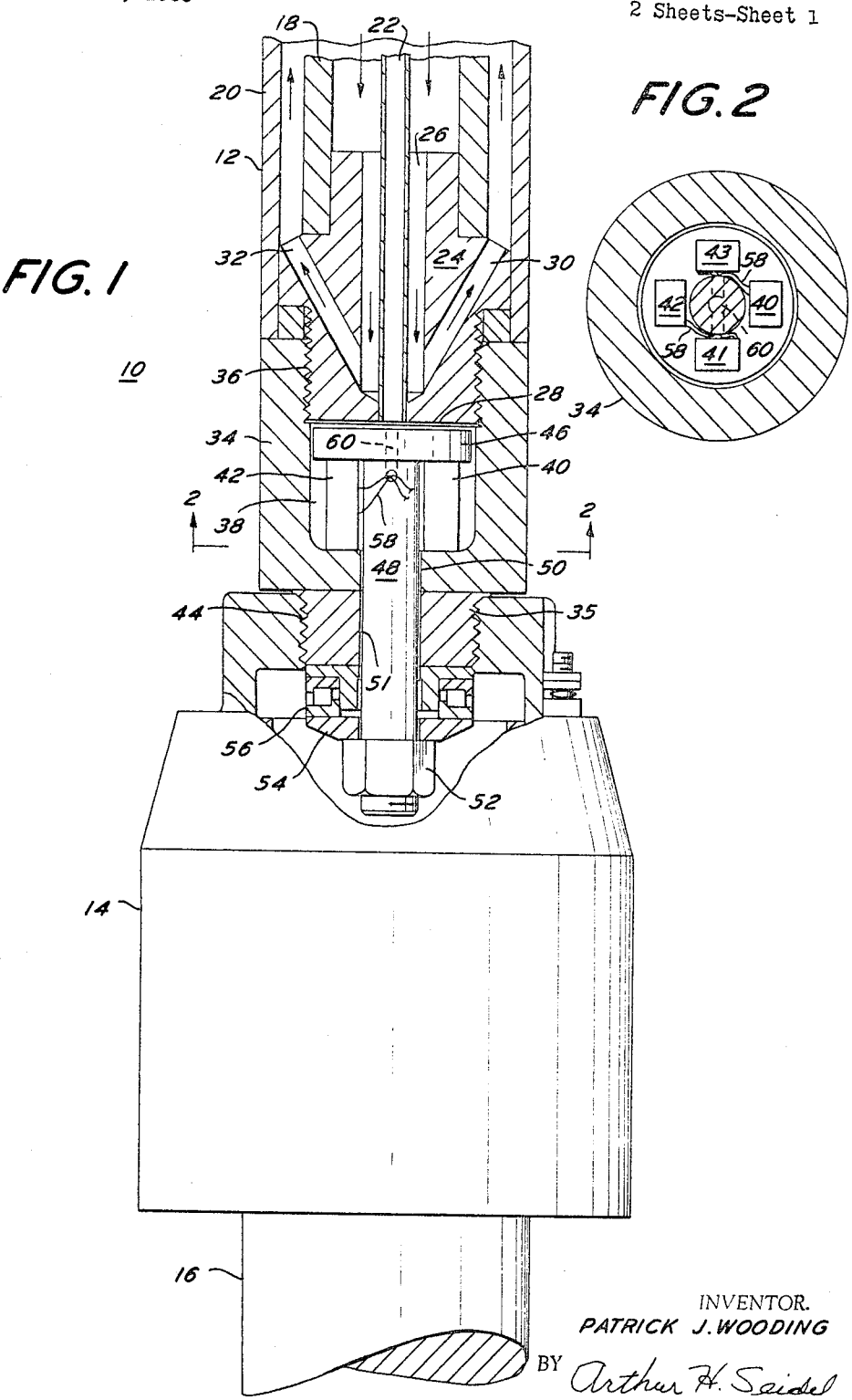
INVENTOR.
PATRICK J. WOODING
BY Arthur H. Saidel
ATTORNEY

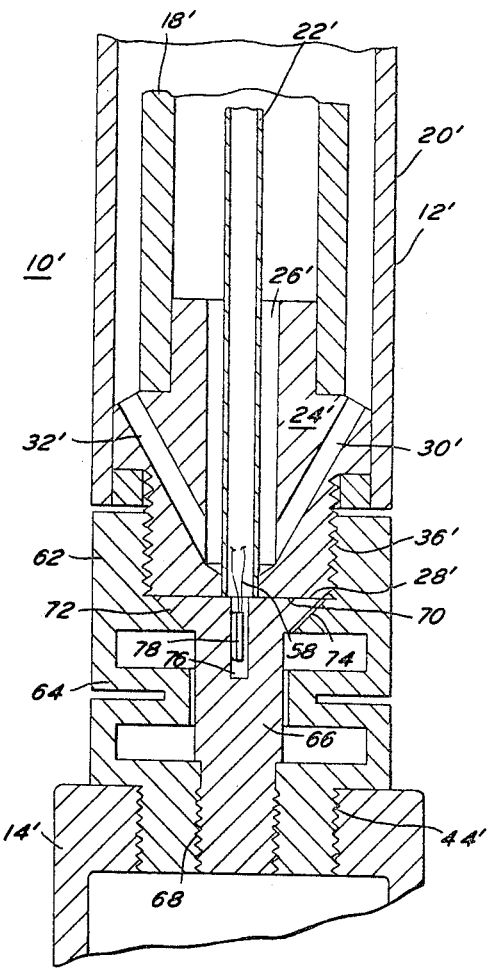
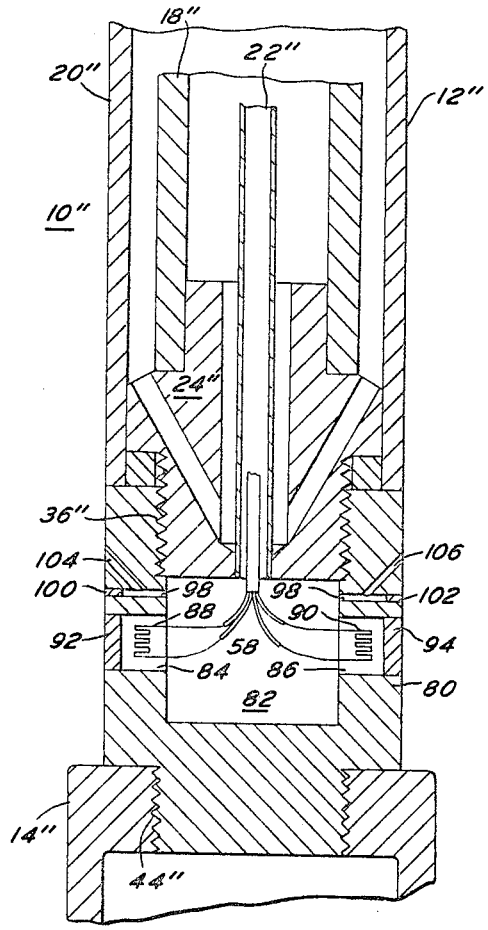
FIG. 3
FIG. 4

United States Patent Office 3,272,905
Patented Sept. 13, 1966

3,272,905
CONTINUOUS WEIGHING OF A CONSUMABLE ELECTRODE
Patrick J. Wooding, Moorestown, N.J., assignor to Consarc Corporation, Rancocas, N.J., a corporation of New Jersey
Filed June 24, 1963, Ser. No. 290,076
20 Claims. (Cl. 13—9)

In general, this invention relates to a new and improved means for and method of continuously weighing a consumable electrode. More particularly, it relates to the continuous weighing of a consumable electrode in a vacuum arc furnace during melting so as to control the melting process in accordance with the weight being measured.

In the past, no furnace designer or melter has been able to measure the decreasing weight of a consumable electrode during vacuum arc melting. The attempts at such weighing have been mostly concerned with indirect methods of weighing such as by measurement of the electrode during melting. However, this is not an accurate system of determining electrode weight. If the electrode is cast after a previous melting operation, which is frequently the case, then the electrode is not homogeneous since substantial primary and secondary pipes will exist. Thus, measurements of the length of the electrode, or the movement of the electrode support ram during melting will not give an acurate determination of weight of electrode consumed.

There are at least two reasons why it is exteremely desirable to have an indication of the weight of electrode consumed. In the first instance, the materials normally melted in a consumable electrode furnace are of substantial value in the "as charged" electrode form. It is, therefore, useful to known precisely when to stop melting so that the maximum amount of metal in the electrode can be melted into the ingot. It is necessary to stop melting before the main electrode section has all been consumed, because the reduced diameter shank of the electrode will not be an effective heat shield to protect the electrode clamp and water-cooled ram. For example, if the "as charged" electrode is 168 inches long, it is desirable to melt 166 inches of this, no more and no less.

The second important advantage in providing a continuous signal proportional to the residual weight of the electrode is the use thereof in predetermining melting current variations on the basis of residual weight. This is of particular value for automation of the entire melting operation so that the power input can be controlled, thus controlling the molten pool volume, and the finished ingot metallurgical properties.

Ingot cooling conditions deteriorate as the height of the ingot in the crucible grows due to shrinkage from the water-cooled copper side walls of the crucible. Therefore, optimum melting current for optimum pool volume will change steadily. With a continuous indication of the residual electrode weight available, it is possible to preset the melting current pattern, feeding this information into a simple system in which the progression of the current supplied to the consumable electrode is a slave to the decreasing weight of the electrode. Thus, truly automatized quality control relative to electrode weight can be achieved irrespective of variations in the homogeneity of the charged electrode. Further, as stated previously, continuous weighing of the electrode clearly enables the system to shut off power at a precise preselected residual stub weight.

The present invention contemplates the use of a load sensitive transducer between the base of the electrode ram and the electrode clamp. In this position, the load cell may support the total weight of the mass to be measured. Additionally, 30,000 (or more) amperes of current are being delivered through the ram to the clamp and thence to the electrode. The problem solved by the present invention is the placement of such a load cell on the ram in a practical manner wherein it will not be affected by the high current being fed to the electrode, but will give a correct reading of the total weight of the electrode.

Therefore, it is the general object of this invention to provide a new and improved method of continuously weighing a consumable electrode.

A further object is the provision of a new and better method of measuring the decreasing weight of a consumable electrode for a vacuum arc furnace by placing a load sensitive transducer between the electrode supporting ram and the electrode clamp.

A still further object of this invention is the provision of new apapratus for continuously measuring the weight of a consumable electrode during vacuum arc melting while supplying current to the electrode.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a partial cross sectional view of apparatus comprising one embodiment of the persent invention.

FIGURE 2 is a cross sectional view of the apparatus of FIGURE 1 taken along the lines 2—2.

FIGURE 3 is a cross sectional view of a second embodiment of the present invention.

FIGURE 4 is a cross sectional view of still another embodiment of the present invention.

The present invention is intended to be utilized with consumable arc vacuum melting furnaces of the type disclosed in my copending patent application Serial No. 270,027, filed April 2, 1963, entitled, "Apparatus for Supporting and Conducting Electrical Current to a Load," now Patent No. 3,202,751. The electrode clamp utilized in the present invention is disclosed in my copending patent application Serial No. 253,220 filed January 22, 1963 and entitled, "Electrode Stub Clamp," now Patent No. 3,215,974.

In FIGURE 1, there is shown an electrode supporting, weight measuring, and current supplying apparatus built in accordance with the principles of the present invention and generally designated by the numeral 10. The apparatus 10 is intended to be part of a consumable electrode vacuum arc melting furnace of the type disclosed in my above-mentioned patent application.

The apparatus 10 comprises an electrode supporting ram 12 coupled to an electrode stub clamp 14 for supporting and conducting electric current to a consumable electrode 16 which is to be melted in the vacuum arc melting furnace.

The ram 12 includes a current carrying copper tube 18 disposed within and spaced inwardly from a chrome-plated steel sleeve 20. A second hollow sleeve 22, manufactured from a metal of low conductivity, is provided within the copper tube 18. At the bottom of the ram 12, there is provided a copper ram head 24 with a centrally disposed bore 26 through which sleeve 22 passes. A bore 26 provides a passageway around the sleeve 22 in communication with the space between sleeve 22 and copper tube 18 in the ram 12. The bore 26 is spaced from the end face 28 of the ram head 24 and is in communication with a plurality of spaced fluid passageways 30 and 32 extending upward and radially outwardly so that their outer ends open into the space between steel sleeve 20 and copper tube 18. The head 24 is shaped so as to support and space tube 18 from sleeve 20 while preventing fluid communication between the interior of tube 18 and the space between the outer surface of tube 18 and sleeve 20 except through bore 26 and fluid communication ports 30 and 32.

A coolant liquid is intended to flow within tube 18 through bore 26 and passageways 30 and 32 into the space between tube 18 and sleeve 20 and thence out the head of the ram. In this manner, current may be fed through tube 18 and head 24 while maintaining the current carrying members at a reasonable temperature.

The head 24 is screw threaded to a bushing 34 by threads 36. The bushing 34 has a load cell cavity 38 therein adapted to receive four load cells 40–43 for purposes which will be discussed below. A separate lower bushing 35 is threadably secured to the electrode stub clamp 14 by screw threads 44.

The load cells 40–43 are held in place in the cavity 38, and bushing 34 is held in abutment with lower bushing 35, by a clamp formed of plate 46 resting on the top faces of load cells 40–43 and integrally attached to a rod 48 passing through a suitable bore 50 in bushing 34 and a bore 51 in bushing 35. The rod 48 is screw threaded to a bolt 52 at the end opposite from plate 46. The bolt 52 clamps a washer 54 through thrust bearings 56 to the bushings 35. Thus, the load cells 40–43 may be prestressed within the load cavity 38 by rotating the nut 52 which presses plate 46 down on the upper faces of load cells 40–43. The rod 48 has a greater modulus of elasticity than the bushing 34 and will, therefore, elongate to a greater extent under the same load than the bushing 34.

The load cells 40—43 are magnetostrictive devices which vary in accordance with the stress placed thereon. The load cells 40–43 are connected by conductors 58 through a suitable bore 60 in rod 48 and plate 46 to the insulated sleeve 22 from whence the conductors may pass through the head of the ram to a suitable measuring circuit. Thus, the conductors 58 will transmit a signal proportional to the load on the load cells 40–43.

Initially, before the electrode 16 is clamped within the electrode stub clamp 14, the load cells 40–43 are prestressed by the bolt 52 acting on plate 46. However, when the electrode 16 is clamped in place in the electrode stub clamp 14, the rod 48 elongates to a greater extent than the bushing 34 due to the weight of the electrode. This relieves the clamping stress on the load cells 40–43. The amount of stress relieved on the load cells 40–43 is proportional to the weight of the electrode.

During the vacuum arc melting process, current is supplied to the electrode 16 through copper tube 18, copper ram head 24, copper bushings 34 and 35, and electrode stub clamp 14. Little current is transmitted to the high impedance path including the load cells 40–43 or the sleeves 20 and 22.

As the electrode is consumed during the vacuum arc melting process, the electrode weight decreases. This causes the rod 48 to contract, increasing the stress on the load cells in accordance with the weight of electrode consumed. This signal can be utilized as discussed previously to control the amount of current being fed to the electrode, or determine when the electrode has been consumed to a point immediately below the stub thereof.

Referring to FIGURE 3, there is shown a second embodiment of the present invention generally designated by the numeral 10'. The apparatus 10' utilizes the same ram and electrode stub clamp as was utilized in the apparatus 10 shown in FIGURES 1 and 2. All elements in the apparatus in FIGURE 3 similar to the elements of the apparatus of FIGURE 1 have been noted with primed numerals.

The ram 12' includes a copper tube 18' surrounded by a steel sleeve 20' and having a second sleeve 22' passing therethrough. The ram head 24' with its associated bore 26' and fluid passages 30' and 32' perform the same functions for the ram 12' as their similar components in FIGURE 1.

Threadably engaged with the ram head 24' is a copper bellows-type bushing 62. The bellows 62 has an expansible portion 64 at the center thereof and is screw threaded to the electrode clamp 14' so as to give a rigid mechanical connection between the ram 12' and the electrode clamp 14'. Additionally, since the copper bellows 62 is a good electrical conductor, current is supplied from tube 18' through ram head 24' and bellows 62 to the electrode stub clamp 14' from whence it is supplied to the consumable electrode.

The bushing 62 has a central bore therein within which is mounted a tension-type stress detector element 66. This tension detector 66 is screw threaded by threads 68 to the inner surface of the bellows 62 adjacent the electrode clamp 14'. The tension detector 66 extends upward from the electrode clamp and has its upper face 70 adjacent the lower face 28' of the ram head 24'. The upper end 72 of the tension detector 66 is expanded into a camming relation with an inclined surface 74 on the inner surface of the bushing 62 immediately below the ram head 28'.

The tension detector 66 has a central bore 76 therein within which is placed a resistance strain gauge 78 secured to one wall of the bore 76. The resistance strain gauge 78 has leads 58' which extend upward through the sleeve 22' from whence they can be led to a suitable read-out circuit.

The apparatus 10' is operated in the following manner:

An electrode is placed in the stud clamp 14'. This expands the bellows 62 in a predictable stress modifying manner. That is, the major portion of the stress will be seen across the expandable portion 64 of the bellows 62. Thus, the tension detector 66 will be tensioned by the weight of the consumable electrode. This tension is measured by the resistance strain gauge 78 and the signal is transmitted through wires 58' to the suitable utilization circuitry. As the consumable electrode is consumed in the vacuum arc melting process, the bellows 62 starts to contract, relieving the tension on the tension detector 66 and thereby decreasing the weight measured by the resistance strain gauge 78. Here, as in the embodiment shown in FIGURE 1, the readings from the resistance strain gauge 78 are passed up through the sleeve 22' through the head of the ram to suitable utilization circuits whereby the current fed to the consumable electrode during vacuum arc melting can be controlled in accordance with a predetermined pattern and the supply can be cut off when a predetermined amount of electrode has been consumed.

In FIGURE 4, there is shown a third embodiment of the apparatus of the present invention generally designated by the numeral 10". The apparatus 10" has a ram 12" and an electrode stub clamp 14" substantially similar to the electrode stud clamps 14 and 14' and the rams 12 and 12' discussed with respect to FIGURES 1–3. In fact, all similar elements in the apparatus 10" have been noted with double primed numerals to indicate their relation to corresponding elements of FIGURES 1–3.

Between the ram 12" and the electrode stub clamp 14", there is provided a copper bushing 80. The bushing 80 is rigidly secured to ram head 24" at screw threads 36" and is additionally secured to electrode stud clamp 14" by screw threads 44". Thus, there is a rigid mechanical connection between ram 12" through the bushing 80 to the electrode stud clamp 14".

The bushing 80 has a centrally disposed cavity 82 immediately below the ram head 24". The busing 80 has two holes 84 and 86 drilled through the side walls thereof into the cavity 82 to act as maximum stress areas. These stress raiser holes are diametrically opposite as noted in FIGURE 4, and have resistance strain gauges 88 and 90 placed on the side walls thereof so as to provide an indication of the stress on the bushing 80.

The holes 84 and 86 have plugs 92 and 94 on the ends thereof so as to prevent metal vapor deposition on the strain gauge elements. Since the bushing 80 is within the vacuum arc melting furnace during the melting operation, vapor from the consumable electrode could rise and be deposited on the strain gauges 88 and 90 through the holes 84 and 86, were the plugs 92 and 94 not provided.

Additionally, a pair of diametrically opposite holes 98 are drilled through the bushing 80 having their ends plugged by elements 100 and 102. The holes 96 and 98 are in communication with suitable angled passageways 104 and 106 drilled through the bushing for pressure equalization thereof.

The strain gauges 88 and 90 are connected through suitable lead wires 58″ up the sleeve 22″ through the head of the ram to suitable utilization apparatus.

The apparatus 10″ is similar in operation to the apparatus 10′ discussed with respect to FIGURE 3. That is, the tension on the bushing 80, due to the weight of the consumable electrode, is measured by the resistance strain gauges 88 and 90 placed at the maximum stress area of the bushing.

In each of the three embodiments illustrated, it should be noted that the water-cooled ram was designed to draw the heat away from the load sensitive element through high thermal conductivity copper. Additionally, this copper is utilized further to carry the relatively high (up to 30,000 amperes on a 30 inch diameter furance) melting current through to the clamp in the electrode. In all of the embodiments, the wiring from the load sensitive element is carried back up through the core of the water-cooled ram to a connection at the top of the ram outside the furnace.

Still further, the load sensitive elements are placed in a bushing with a stress raising portion, such as the expandable bellows 64 of the bushing 62, the holes 84 and 86 of the bushing 80, or the rod 48 which clamps the bushings 34 and 35 in FIGURE 1. The tension bushing arrangements are placed between the ram and the electrode clamp to act as connecting means. In this position, there are little or no losses which would create errors in the reading of the weight of the consumable electrode.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a vacuum furnace, an electrically conducting ram, an electrode stub clamp, connecting means within the furnace for connecting said ram to said clamp, said connecting means including a load sensing means for sensing the weight of an electrode held by said clamp by determining the stress on said connecting means, said connecting means being operative to conduct current from said ram to said clamp.

2. The apparatus of claim 1 wherein said load sensing means is operative to determine the weight of an electrode held by said clamp by determining the stress on said connecting means.

3. The apparatus of claim 2 wherein said connecting means includes an area of maximum stress, said load sensing means being operative to sense the stress in said area of maximum stress.

4. The apparatus of claim 2 wherein said connecting means is made of a material of high thermal and electrical conductivity.

5. Consumable electrode support and current supply apparatus comprising an electrically conducting ram, an electrode stub clamp, connecting means for connecting said ram to said clamp, said connecting means including a load sensing means, said load sensing means being operative to determine the weight of an electrode held by said clamp by determining the stress on said connecting means, said connecting means being operative to conduct current from said ram to said clamp, said connecting means including an area of maximum stress, said load sensing means being operative to sense the stress in said area of maximum stress, said connecting means including an annular bushing secured between said ram and said stub clamp, said bushing having holes therein, said bushing holes forming the area of maximum stress, said load sensing means being placed on the walls of said bushing within said holes.

6. The apparatus of claim 5 wherein said bushing holes pass through the side walls of said bushing, and plugs on the outer surface of said bushing covering said holes to prevent the deposition of metal vapor within said holes.

7. Consumable electrode support and current supply apparatus comprising an electrically conducting ram, an electrode stub clamp, connecting means for connecting said ram to said clamp, said connecting means including a load sensing means, said load sensing means being operative to determine the weight of an electrode held by said clamp by determining the stress on said connecting means, said connecting means being operative to conduct current from said ram to said clamp, said connecting means including an area of maximum stress, said load sensing means being operative to sense the stress in said area of maximum stress, said connecting means having an expandable portion centrally located between said ram and said electrode stub clamp, said expandable portion forming said area of maximum stress.

8. The apparatus of claim 7 wherein said connecting means is resilient bellows formed of a material having high thermal and electrical conductivity.

9. Consumable electrode support and current supply apparatus comprising an electrically conducting ram, an electrode stub clamp, connecting means for connecting said ram to said clamp, said connecting means including a load sensing means, said load sensing means being operative to determine the weight of an electrode held by said clamp by determining the stress on said connecting means, said connecting means being operative to conduct current from said ram to said clamp, said load sensing means being operative to determine the weight of an electrode held by said clamp by determining the stress on said connecting means, said connecting means including first and second separable connectors, said first separable connector being rigidly secured to said ram, said second separable connector being rigidly secured to said clamp, said connecting means further including an elongatable member, said member elongating to a greater extent under load than said separable connectors, said load sensing means being operative to determine the weight of an electrode in accordance with the elongation of said member.

10. The apparatus of claim 9 wherein said member includes a pressure plate, said first separable connector having a cavity therein, said member extending through said cavity, said load sensing means being placed within said cavity between one wall of said cavity and said pressure plate, said pressure plate being rigidly secured to said second separable connector.

11. The apparatus of claim 10 including prestressing means, said prestressing means being operative to prestress said member, said prestressing means being operative to vary the rigid connection between said member and said second separable connector.

12. A method of measuring the weight of a consumable electrode in a vacuum arc furnace comprising the steps of providing a current carrying ram and an electrode clamp, connecting said ram with said clamp in mechanical and electrical conductive relation, connecting said clamp to a consumable electrode, supporting said consumable electrode by said ram and clamp within a consumable arc melting furnace, measuring the tensile stress at a position within the furnace caused by the weight of said electrode on said ram and clamp.

13. The method of claim 12 wherein the step of connecting said ram to said clamp includes providing an electrically conducting connecting means, said step of measuring the stress comprising measuring the stress in said connecting means.

14. A method of measuring the weight of a consumable electrode in a vacuum arc furnace comprising the steps of providing a current carrying ram and an electrode clamp, connecting said ram to said clamp in mechanical and electrical conductive relation with an electrically conducting connecting means, connecting said clamp to a consumable electrode, supporting said consumable electrode by said ram and clamp within a consumable arc melting furnace, measuring at a position within said furnace the tensile stress in said connecting means caused by the weight of said electrode on said ram and clamp, said step of measuring including placing a stress sensitive element within said connector, prestressing said stress sensitive element before clamping the electrode to said clamp, the clamping of the electrode to the clamp being operative to relieve the stress on said stress sensitive element, the consuming of the electrode within the furnace being operative to return the prestressing force to said stress sensitive element.

15. Apparatus comprising a vacuum furnace, an electrically conducting ram, an electrode stub clamp, connecting means within the furnace for connecting said ram to said clamp, said connecting means being operative to conduct current from said clamp to said ram, and load sensing means, said load sensing means being located intermediate said conducting ram and said stub clamp and on said connecting means for sensing the weight of an electrode held by said clamp by determining the stress on said apparatus.

16. Apparatus comprising a vacuum furnace, an electrode supporting ram, an electrode stub clamp, connecting means within the furnace for connecting the lower end of said ram to said clamp, transducer means for developing an electric signal in response to changes in the weight of an electrode, said transducer means being mounted on said connecting means.

17. Apparatus comprising a vacuum furnace, an electrode supporting ram, an electrode stub clamp, a connector within the furnace for connecting said ram to said clamp, said connector including at least a portion for developing a strain in response to the stress imparted therein by an electrode means supported by said clamp, and a transducer on said connector for developing an electric signal in response to changes in the strain in said connector, whereby said electric signal is proportional to the weight of an electrode.

18. Apparatus comprising a vacuum furnace, an electrically conducting ram, an electrode stub clamp, a connector within said furnace for connecting said ram to said clamp, said connector including at least a portion for developing a strain in response to the stress imparted therein by an electrode being supported by said clamp, and a transducer on said connector for developing an electric signal in response to changes in the strain in said connector, whereby said electric signal is proportional to the weight of an electrode, said connector being electrically conductive for conducting current from said ram to said clamp.

19. A vacuum arc furnace comprising a consumable electrode support including a ram, an electrode stub clamp, and a connector for connecting the lower end of said ram to said clamp, said connector being positioned within said furnace during furnace operation, transducer means for developing an electric signal in response to changes in the weight of an electrode, said transducer means being mounted on said connector.

20. A vacuum arc furnace including a consumable electrode support apparatus, a ram, an electrode stub clamp, connecting means for connecting said ram to said clamp, said connecting means being positioned within said furnace during furnace operation, said connecting means including a portion dimensioned to provide an area of maximum stress changing dimension in response to stress applied to said connecting means by a consumable electrode, and a transducer connected to said poriton for converting said changes in stress to an electric signal, whereby said electric signal is proportional to changes in the weight of said electrode.

References Cited by the Examiner
UNITED STATES PATENTS

| | | | |
|---|---|---|---|
| 2,285,837 | 6/1942 | Ridgway | 13—34 |
| 2,857,445 | 10/1958 | Mangin | 13—9 |
| 2,907,806 | 10/1959 | Rossin et al. | 13—9 |
| 2,951,890 | 9/1960 | Yeomans et al. | 13—34 |
| 2,964,580 | 12/1960 | Jones et al. | 13—14 X |
| 3,171,879 | 3/1965 | Gruber et al. | 13—31 |
| 3,179,734 | 4/1965 | Redel et al. | 324—71 |

RICHARD M. WOOD, *Primary Examiner.*

JOSEPH V. TRUHE, ANTHONY BARTIS, *Examiners.*